US009250330B2

(12) United States Patent
Rhodes et al.

(10) Patent No.: US 9,250,330 B2
(45) Date of Patent: Feb. 2, 2016

(54) METHOD AND SYSTEM FOR SELECTING OPTIMAL SATELLITES FOR A-GPS LOCATION OF HANDSETS IN WIRELESS NETWORKS

(75) Inventors: Peter John Rhodes, Wollongong (AU); Neil Harper, Mangerton (AU)

(73) Assignee: Telecommunication Systems, Inc., Annapolis, MD (US)

( * ) Notice: Subject to any disclaimer, the term of this patent is extended or adjusted under 35 U.S.C. 154(b) by 1768 days.

(21) Appl. No.: 12/392,400

(22) Filed: Feb. 25, 2009

(65) Prior Publication Data

US 2010/0171655 A1 Jul. 8, 2010

Related U.S. Application Data

(63) Continuation-in-part of application No. 12/050,794, filed on Mar. 18, 2008, now Pat. No. 7,800,530.

(60) Provisional application No. 61/142,738, filed on Jan. 6, 2009, provisional application No. 61/012,319, filed on Dec. 7, 2007.

(51) Int. Cl.
*G01S 19/28* (2010.01)
*G01S 19/25* (2010.01)
*G01S 19/05* (2010.01)

(52) U.S. Cl.
CPC ............. *G01S 19/28* (2013.01); *G01S 19/05* (2013.01); *G01S 19/258* (2013.01)

(58) Field of Classification Search
USPC ........................................ 342/357.67, 357.43
See application file for complete search history.

(56) References Cited

U.S. PATENT DOCUMENTS

| 4,928,107 | A | * | 5/1990 | Kuroda et al. ........... 342/357.67 |
| 5,543,813 | A | | 8/1996 | Araki et al. |
| 5,999,125 | A | | 12/1999 | Kurby |
| 6,072,430 | A | * | 6/2000 | Wyrwas et al. .......... 342/357.42 |
| 6,353,738 | B1 | | 3/2002 | Chandra |
| 6,429,808 | B1 | | 8/2002 | King et al. |
| 6,583,756 | B2 | | 6/2003 | Sheynblat |
| 6,661,371 | B2 | | 12/2003 | King et al. |

(Continued)

FOREIGN PATENT DOCUMENTS

| EP | 874248 A2 * 10/1998 | ................ G01S 5/14 |
| EP | 0984295 A | 3/2000 |

(Continued)

OTHER PUBLICATIONS

European Patent Office, International Search Report in related PCT Application No. PCT/US2008/013236, mailed May 6, 2009, p. 1-4.

(Continued)

*Primary Examiner* — Gregory C Issing
(74) *Attorney, Agent, or Firm* — Tarolli, Sundheim, Covell & Tummino LLP (57) ABSTRACT

A system and method for determining a set of satellites for which assistance data may be provided to a wireless device. A boundary for an approximate area in which the wireless device is located may be determined and one or more sets of satellites may be determined as a function of the boundary. An optimum set of satellites from the one or more sets of satellites may then be determined using a satellite selection function on the one or more sets of satellites at predetermined points substantially on the boundary.

14 Claims, 4 Drawing Sheets

(56) References Cited

U.S. PATENT DOCUMENTS

| | | | |
|---|---|---|---|
| 6,727,850 B2 * | 4/2004 | Park et al. | 342/357.25 |
| 6,804,290 B1 | 10/2004 | King et al. | |
| 6,825,805 B2 * | 11/2004 | Rowitch | 342/357.25 |
| 7,019,690 B1 | 3/2006 | Pitt | |
| 7,064,706 B2 | 6/2006 | King et al. | |
| 7,138,943 B2 | 11/2006 | Sheynblat | |
| 7,142,155 B2 | 11/2006 | Iwami | |
| 2001/0048387 A1 * | 12/2001 | Sheynblat | 342/357.09 |
| 2003/0011511 A1 | 1/2003 | King et al. | |
| 2005/0164713 A1 | 7/2005 | Tang-Taye | |
| 2005/0212700 A1 | 9/2005 | Diggelen et al. | |
| 2006/0012515 A1 | 1/2006 | Park et al. | |
| 2006/0111840 A1 | 5/2006 | Diggelen et al. | |
| 2007/0236387 A1 | 10/2007 | Monnerat | |

FOREIGN PATENT DOCUMENTS

| | | |
|---|---|---|
| EP | 1783509 A1 | 5/2007 |
| JP | 0791976 A | 4/1995 |
| KR | 0108419 A | 12/2008 |

OTHER PUBLICATIONS

Glennon, E. and Bryant, R., "Solution of Timing Errors for AGPS," 18th Int. Tech. Meeting of the Satellite Division of the U.S. Institute of Navigation, Long Beach, CA, Sep. 13-16, 2005.

European Patent Office, International Search Report in related PCT Application No. PCT/US2008/013239, mailed May 6, 2009, p. 1-4.

European Patent Office, International Search Report in related PCT Application No. PCT/US2008/013231, mailed May 6, 2009, p. 1-4.

European Patent Office, International Search Report in related PCT Application No. PCT/US2008/013237, mailed May 6, 2009, p. 1-3.

Hill, Jonathan, "The Principle of a Snapshot Navigation Solution Based on Doppler Shift," ION GPS 2001, Salt Lake City, UT, Sep. 11-14, 2001, p. 3044-3051.

\* cited by examiner

METHOD AND SYSTEM FOR SELECTING OPTIMAL SATELLITES FOR A-GPS LOCATION OF HANDSETS IN WIRELESS NETWORKS

RELATED APPLICATIONS

The instant application claims the priority benefit of U.S. Provisional Application No. 61/142,738, entitled, "Method and System for Selecting Optimal Satellites for A-GPS Location of Handsets in Wireless Networks," filed Jan. 6, 2009, the instant application is co-pending with and related to U.S. application Ser. No. 12/395,803, entitled, "Method and System for Selecting Optimal Satellites for A-GPS Location of Handsets in Wireless Networks," filed Mar. 2, 2009, which issued as U.S. Pat. No. 7,928,903 on Apr. 19, 2011, the instant application is also a Continuation-in-Part application and claims the priority benefit of U.S. patent application Ser. No. 12/050,794, entitled, "System and Method for Providing Assistance Data for A-GPS Location of Handsets in Wireless Networks," filed Mar. 18, 2008, which issued as U.S. Pat. No. 7,800,530 on Sep. 21, 2010 and which claims the priority benefit of U.S. Provisional Application No. 61/012,319, filed Dec. 7, 2007, the entirety of each are incorporated herein by reference.

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, in 2001 the United States Federal Communications Commission ("FCC") required that cellular handsets must be geographically locatable. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

Figure 1:
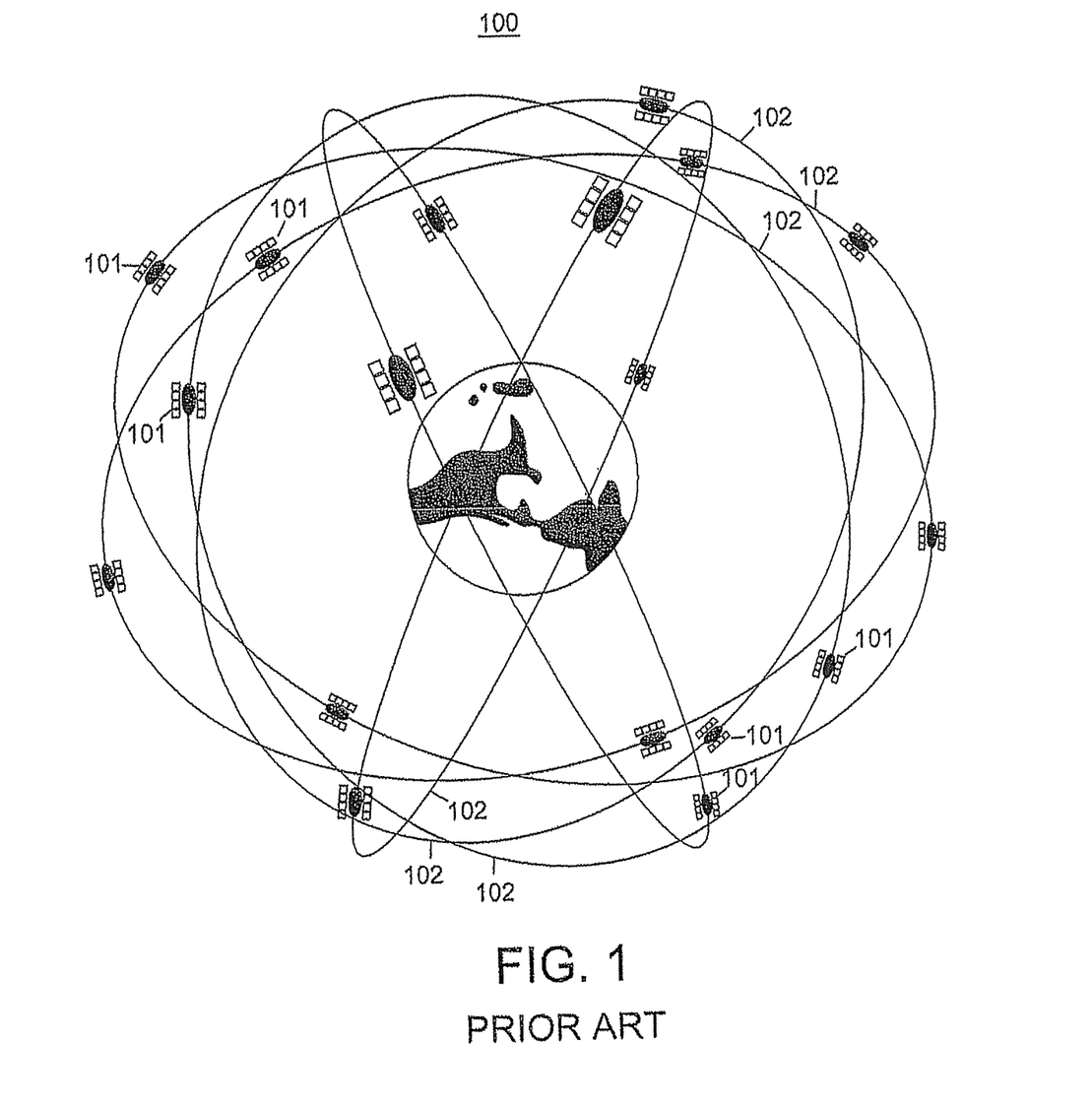
FIG. 1 is a schematic representation of a constellation of GPS satellites.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are conventionally utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time. There is also an L2C signal being transmitted by several satellites. The L2C signal is a second civilian frequency transmitted by GPS satellites. transmits the Coarse Acquisition ("C/A") code. L2C transmits L2CM (civil-moderate) and L2CL (civil long) codes. These codes allow a device to differentiate between satellites that are all transmitting on the same frequency. The C/A code is 1 milliseconds long, the L2CM is 20 milliseconds long and the L2CL is 1.5 seconds long. The L2C codes provide a more robust cross-correlation performance so that reception of weak GPS signals is less affected by simultaneously received strong GPS signals. The civil navigation message ("CNAV") is the broadcast model that can be transmitted on the L2C and provides a more accurate and frequent message than the legacy navigation message ("NAV").

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors, and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems generally account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time, is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Traditionally, satellite coordinates and velocity have been computed inside the GPS receiver. The receiver obtains satellite ephemeris and clock correction data by demodulating the satellite broadcast message stream. The satellite transmission contains more than 400 bits of data transmitted at 50 bits per second. The constants contained in the ephemeris data coincide with Kepler orbit constants requiring many mathematical operations to turn the data into position and velocity data for each satellite. In one implementation, this conversion requires 90 multiplies, 58 adds and 21 transcendental function cells (sin, cos, tan) in order to translate the ephemeris into a satellite position and velocity vector at a single point, for one satellite. Most of the computations require double precision, floating point processing.

Thus, the computational load for performing the traditional calculation is significant. The mobile device must include a high-level processor capable of the necessary calculations, and such processors are relatively expensive and consume large amounts of power. Portable devices for consumer use, e.g., a cellular phone or comparable device, are preferably inexpensive and operate at very low power. These design goals are inconsistent with the high computational load required for GPS processing. Further, the slow data rate from the GPS satellites is a limitation. GPS acquisition at a GPS receiver may take many seconds or several minutes, during which time the receiver circuit and processor of the mobile device must be continuously energized. Preferably, to maintain battery life in portable receivers and transceivers such as mobile cellular handsets, circuits are de-energized as much as possible. The long GPS acquisition time can rapidly deplete the battery of a mobile device. In any situation and particularly in emergency situations, the long GPS acquisition time is inconvenient.

Assisted-GPS ("A-GPS") has gained significant popularity recently in light of stringent time to first fix ("TTFF"), i.e., first position determination and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network or a wide area reference network ("WARN")) including receivers with clear views of the sky that may operate continuously. This reference network may also be connected with the cellular infrastructure, may continuously monitor the real-time constellation status, and may provide data for each satellite at a particular epoch time. For example, the reference network may provide ephemeris information, UTC model information, ionosphere model information, and other broadcast information to the cellular infrastructure. As one skilled in the art would recognize, the GPS reference receiver and its server (or position determining entity) may be located at any surveyed location with an open view of the sky. Typical A-GPS information may include data for determining a GPS receiver's approximate position, time synchronization mark, satellite ephemerides, various model information and satellite dopplers. Different A-GPS services may omit some of these parameters; however, another component of the supplied information is the identification of the satellites for which a device or GPS receiver should search. From such assistance data, a mobile device will attempt to search for and acquire satellite signals for the satellites included in the assistance data. If, however, satellites are included in the assistance data that are not measurable by the mobile device (e.g., the satellite is no longer visible, etc.), then the mobile device will waste time and considerable power attempting to acquire measurements for the satellite.

A-GPS handset implementations generally rely upon provided assistance data to indicate which satellites are visible. As a function of the assistance data, a mobile device will attempt to search for and acquire satellite signals for the satellites included in the assistance data. A-GPS positioning may also rely upon the availability of a coarse location estimate to seed the positioning method. This coarse estimate may be utilized to determine a likely set of satellites from which a respective mobile device may receive signals. In the absence of a location estimate or in scenarios having a location estimate with a large uncertainty, the likely set of measurable satellites may be quite large. Further, each of these satellites may not be measurable (e.g., the satellite is no longer visible, etc.). If satellites are included in the assistance data that are not measurable by the mobile device, then the mobile device will waste time and considerable power attempting to acquire measurements for the satellite. Further, signaling methods often limit the number of satellites for which signals may be provided.

Furthermore, the signal received from each of the satellites may not necessarily result in an accurate position estimation of the handset or mobile device. The quality of a position estimate largely depends upon two factors: satellite geometry, particularly, the number of satellites in view and their spatial distribution relative to the user, and the quality of the measurements obtained from satellite signals. For example, the larger the number of satellites in view and the greater the distances therebetween, the better the geometry of the satellite constellation may be. Further, the quality of measurements may be affected by errors in the predicted ephemeris of the satellites, instabilities in the satellite and receiver clocks, ionospheric and tropospheric propagation delays, multipath, receiver noise and RF interference. In cases where a user with a GPS receiver obtains code-phase ranges with respect to a plurality of satellites in view, without consulting with any reference station, or where the user is at an unknown location, the user may be limited in methods to reduce the errors or noises in the ranges or even determine a position calculation.

Accordingly, there is a need for a method and system for selecting optimal satellites for A-GPS location of a device that would overcome the deficiencies of the prior art. Therefore, an embodiment of the present subject matter provides a method for determining a set of satellites for which assistance data may be provided to a wireless device. The method comprises determining a boundary for an approximate area in which the wireless device is located and determining one or more sets of satellites as a function of the boundary. An optimum set of satellites may then be determined from the one or more sets of satellites as a function of the visibility of the one or more sets of satellites at predetermined points substantially on the boundary.

Another embodiment of the present subject matter may provide a method for determining a set of satellites for which assistance data may be provided to a wireless device. The method comprises determining a boundary for an approximate area in which the wireless device is located and determining one or more sets of satellites as a function of the boundary. An optimum set of satellites may then be determined from the one or more sets of satellites as a function of the dilution of precision ("DOP") of the one or more sets of satellites at predetermined points substantially on the boundary.

A further embodiment of the present subject matter provides a method for determining the location of a wireless device. The method comprises the steps of determining a boundary for an approximate area in which the wireless device is located, determining one or more sets of satellites as a function of the boundary, and determining an optimum set of satellites from the one or more sets of satellites as a function of the visibility of the one or more sets of satellites at predetermined points substantially on the boundary. Assistance data may be transmitted to the device, the assistance data including information from the optimum set of satellites, and a location of the wireless device may be determined from the information.

An additional embodiment of the present subject matter provides a method for determining the location of a wireless device. The method may comprise determining a boundary for an approximate area in which the wireless device is located, determining one or more sets of satellites as a function of the boundary, and determining an optimum set of satellites from the one or more sets of satellites as a function of the DOP of the one or more sets of satellites at predetermined points substantially on the boundary. Assistance data may be transmitted to the device, the assistance data including information about the optimum set of satellites, and a location of the wireless device may be determined from the information.

One embodiment of the present subject matter may provide a system for determining a set of satellites for which assistance data may be provided to a wireless device. The system may comprise circuitry for determining a boundary for an approximate area in which a wireless device is located and circuitry for determining one or more sets of satellites as a function of the boundary. The system may further comprise circuitry for determining an optimum set of satellites from the one or more sets of satellites as a function of a satellite selection function at predetermined points substantially on the boundary.

These embodiments and many other objects and advantages thereof will be readily apparent to one skilled in the art to which the invention pertains from a perusal of the claims, the appended drawings, and the following detailed description of the embodiments.

DETAILED DESCRIPTION

With reference to the figures where like elements have been given like numerical designations to facilitate an understanding of the present subject matter, the various embodiments of a method and system for selecting optimal satellites for Assisted GPS ("A-GPS") location of a device and for providing assistance data for A-GPS location of devices in a wireless network or other region are herein described.

The disclosure relates to a mobile appliance or device and a location determining system using satellite signals and/or measurements of these satellite signals. Exemplary devices may include, but are not limited to, a cellular device, text messaging device, computer, portable computer, vehicle locating device, vehicle security device, communication device, and wireless transceiver. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to GPS, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above.

Generally wireless A-GPS devices or handsets have a low time to first fix ("TTFF") as the devices are supplied with assistance data from an exemplary communications network to assist in locking onto or acquiring satellites quickly. Exemplary A-GPS devices may include, but are not limited to, a cellular device, text messaging device, computer, portable computer, vehicle locating device, vehicle security device, communication device, and wireless transceiver. These devices may provide satellite measurements back to a location determining system to perform a position calculation. Exemplary network elements that supply the assistance data and/or perform the position calculation may be a location determining system such as a Mobile Location Center ("MLC"), location information server or system ("LIS"), or other comparable network element. The location determining system may generally be a node in a wireless network that performs the location of a mobile device.

Typical A-GPS information includes data for determining a GPS receiver's approximate position, time synchronization mark, satellite ephemerides, and satellite dopplers. Different A-GPS services may omit some of these parameters; however, another component of the supplied information may be the identification of the satellites for which a device or GPS receiver should search. The MLC generally determines this information utilizing an approximate location of the device. Conventionally, this approximate location is the location of the cell tower serving the device. The MLC may then supply the device with the appropriate A-GPS assistance data for the set of satellites in view from this conventional location.

This typical process performs well when the approximate location possesses a small uncertainty, such as several hundred kilometers or less in the case with present cellular technology, since the visible satellites for a device generally do not change significantly over these several hundred kilometers. The approximate location may, however, possess a larger uncertainty, such as, but not limited to, five hundred, one thousand or more kilometers. An initial uncertainty area may come from an approximate location that may not be based on a cell identification but may be a function of an Mobile Country Code ("MCC"), Mobile Network Code ("MNC"), and/or an Area-Identification ("Area-ID") resulting in a much larger region than a cell. For example, if the respective network is a GSM EDGE Radio Access Network ("GERAN"), the Area-ID would be a location area code ("LAC"). Similarly, if the respective network is a UMTS Terrestrial Radio Access Network ("UTRAN"), the Area-ID would be a Radio Network Controller-Identification ("RNC-ID"). When the initial uncertainty is large, providing visible satellites from the center of an approximate area or region may be inadequate for a quality position estimate of a respective device. Further, in conventional systems, if the device is near the perimeter of an area or region, there may be additional satellites in view of the device for which assistance data would not be supplied. These additional satellites are generally not visible from the center of the area conventionally utilized as a basis for including satellites.

While these additional satellites may be low on the horizon (e.g., between 10 and 30 degrees), these satellites are often quite valuable for a position calculation of the device, as signals therefrom may improve the dilution of precision ("DOP") for a respective position calculation. DOP generally represents a measure of the geometric spread of the satellites that a receiver measures. Therefore, when measured satellites are evenly spread through the sky, a better DOP may be received and a more accurate location calculated.

Furthermore, in the event that the approximate location of a device is unknown or cannot be determined, conventional networks cannot determine satellites in view and generally may not supply the device with appropriate assistance data. Embodiments of the present subject matter allow a communications network to supply appropriate assistance data when the approximate location of a device is unknown or cannot be determined by utilizing the boundary of a predetermined region or area and/or the boundary of the communications network to determine satellites in view.

While an alternate implementation of the present subject matter would provide a device with assistance data for all satellites, network protocols generally limit the number of satellites that an exemplary MLC may provide assistance data for (e.g., Radio Resources Location Services Protocol ("RRLP") and Positioning Calculation Application Part ("PCAP") protocol allow a maximum of 16 satellites). In addition, GPS receiver hardware generally has a limited number of channels (often 12) on which it can search for satellites in parallel. Therefore, embodiments of the present subject matter may select satellites for assistance data as a function of probability and distribution and may also thin or prune such satellites as a function of their respective proximity to other satellites. It is thus an aspect of embodiments of the present subject matter to provide pertinent assistance data when the initial location uncertainty is large. This may then improve the yield and accuracy of a resulting location fix.

Various scenarios where embodiments of the present subject matter may be employed may be, but are not limited to, when the location of the device or handset is unknown and assistance data is requested by an A-GPS handset, e.g., when a new cell is added or renamed or when an MLC is serving a network where the MLC possesses no knowledge of the individual cell locations (such as a bureau type operation where the MLC is serving several operators in one country without details of the specific cells).

In scenarios where an approximate location possesses a large uncertainty, the device or handset may not receive assistance data for critical satellites, and the resulting location of the device may be poor (i.e., a low DOP) or a location may not be calculated at all. In scenarios having an unknown location, embodiments of the present subject matter may consider the perimeter of the area or region in which the device or handset is located. This may be a location having a large uncertainty or in the case where the boundary is unknown, the location may be a city, municipality, state, country or continent. For example, in one non-limiting embodiment of the present subject matter, a series of points around the perimeter of the boundary of an area may be selected and the satellites in view from these points are determined. Additionally, as the number of visible satellites does not generally change within 100 km of a defined point, then any one or more of the series of points may be optimized and/or extrapolated to be this distance within the boundary to thereby reduce the number of points calculated.

In one embodiment of the present subject matter, visible satellites from a defined region may be determined and/or culled if there are more than the maximum number allowed by a respective protocol (e.g., RRLP, PCAP, etc.), or if it is known that the handsets have an upper limit to the number of satellites for which they may search, e.g., they possess a fixed number of channels. Exemplary methods to cull or reduce satellites may include, but are not limited to, reducing satellites at elevations less than a predetermined threshold on the horizon, reducing or thinning adjacent satellites as a function of the distance therebetween, and/or reducing or thinning satellites having a high altitude (e.g., if altitude accuracy is of a lower importance).

In another embodiment of the present subject matter, satellites may be reduced by determining the position of any number or all of the satellites in a complete set in earth-centered earth fixed ("ECEF") coordinates and determining a distance between each satellite in the set. An exemplary distance may be, but is not limited to, a straight line distance, etc. Further, satellites may be reduced or removed from the set having a sum of the distances to any one or plural satellites that is at or below a predetermined minimum threshold. Of course, this process may be iteratively continued and/or the predetermined threshold adjusted until a sufficient number of satellites have been removed.

In a further embodiment of the present subject matter, satellites in view from the perimeter or boundary of an area where a mobile device is located may be considered utilizing an alternative process. In certain embodiments, the boundary may define a serving area of a base station serving the mobile device. Of course, the boundary may also define an approximate area of a communications network or an area or region such as, but not limited to, city, municipality, county, state, country, continent, or other area or polygon defined as a function of MCCs, MNCs and/or Area-IDs, such as LACs and RNC-IDs. Further, the perimeter or boundary of the area may be quantified as the vertices of a polygon or may be any other type of shape such as an ellipse or a bounding box. The satellites visible from this boundary may then be collated into a list of satellites visible from the coverage area. This may be readily illustrated utilizing the following relationship:

$$n = b - a \qquad (1)$$

where a represents a maximum number of satellites that can be sent to a mobile device, b represents a number of satellites visible in the initial uncertainty area, and n represents a number of satellites that should be removed from a set of satellites delivered to a respective A-GPS capable device.

With reference to Equation (1), if n is greater than zero, then a leave-n-out algorithm may be applied to the complete set of satellites to select a subset of satellites resulting in an optimum solution to an exemplary satellite selection function. This leave-n-out algorithm may be employed to determine the satellite selection function for each combination of n satellites left out of the set. For example, assuming that the maximum number of satellites that can be sent to a device is 2 (a=2), and the satellites visible in the initial uncertainty location are 1, 2, 3, and 4 (b=4), then n=2. Since n is greater than zero, a leave-2-out process may be implemented. The satellite selection function may thus be determined for the following sets of satellites:

1, 2 (3 and 4 left out),
1, 3 (2 and 4 left out),
1, 4 (2 and 3 left out),
2, 3 (1 and 4 left out),
2, 4 (1 and 3 left out), and
3, 4 (1 and 2 left out).

Once an appropriate satellite selection function has been determined, a satellite set may be selected that produces an optimum result.

In one embodiment, an exemplary satellite selection function may be to maximize the number of satellites in view for each satellite set. This function, determined for each satellite set, is provided below in Equation (2) and may be determined for each set of satellites generated by the leave-n-out process.

$$f_{satsViewBased} = \sum_{i=1}^{noPoints} (noSatsInView^i \geq 4\,?\,noSatsInView^i : 0) \quad (2)$$

The optimum set of satellites may be the set that maximizes the above function in Equation (2), that is, the set that results in the highest value. With reference to Equation (2), noSatsInView$^i$ represents a number of satellites visible for each point (i) selected substantially on the boundary of the initial uncertainty area. When there are four or more satellites in view, the number of satellites for the point (i) may be equal to the number of satellites in view. Alternatively, the number of satellites may be set to zero because a valid location may not be calculated with the number of satellites in view; however, it is possible that when a two-dimensional fix is acceptable, the 4 in Equation (2) may substituted with a 3.

An alternative satellite selection function may be to determine the DOP at each point (i) and minimize the function across each set of satellites as illustrated by the following relationship:

$$f_{DOPBased} = \sum_{i=1}^{noPoints} DOP^i() \quad (3)$$

A DOP may be determined at each point (i) selected around the boundary of the initial location area and the function evaluated. The set of satellites resulting in the lowest sum of the DOP may then be selected as an optimum set.

Figure 2:
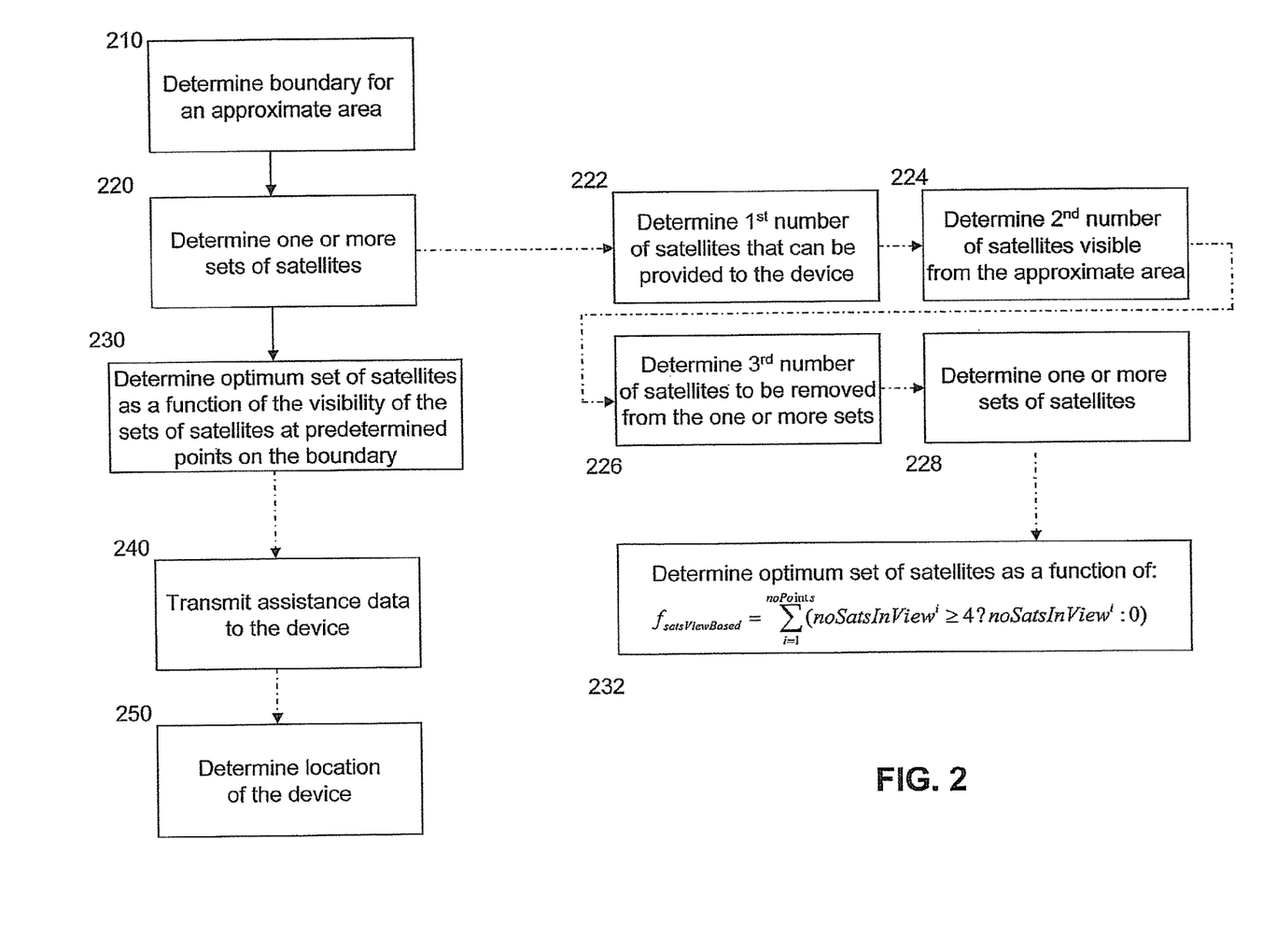
FIG. 2 is an algorithm according to one embodiment of the present subject matter.

FIG. 2 is an algorithm 200 according to one embodiment of the present subject matter. With reference to FIG. 2, at step 210, a boundary for an approximate area in which the wireless device is located may be determined. In certain embodiments of the present subject matter, the boundary may define a serving area of a base station serving the wireless device. However, the boundary may also define an approximate area of a communications network or an area or region such as, but not limited to, city, municipality, county, state, country, or continent. An exemplary device may be, but is not limited to, a cellular device, text messaging device, computer, portable computer, vehicle locating device, vehicle security device, communication device, and wireless transceiver. At step 220, one or more sets of satellites may be determined as a function of the boundary. The satellites may be a part of a GNSS such as, but not limited to, GPS, Galileo system, GLONASS system, QZSS, Beidou satellite system, Compass satellite system, and combinations thereof. At step 230, an optimum set of satellites may be determined from the one or more sets of satellites as a function of the visibility of the one or more sets of satellites at predetermined points substantially on the boundary.

In another embodiment of the present subject matter, at step 222, a first number of satellites that can be provided to the wireless device may be determined and at step 224, a second number of satellites visible from the approximate area may be determined. At step 226, a third number of satellites to be removed from the one or more sets of satellites may be determined and at step 228, the one or more sets of satellites may then be determined as a function of the first, second and third numbers. In an additional embodiment of the present subject matter, at step 232, an optimum set of satellites may be determined by maximizing the number of satellites in view from each of the one or more predetermined points. An exemplary relationship in such an embodiment may be, but is not limited to, the relationship:

$$f_{satsViewBased} = \sum_{i=1}^{noPoints} (noSatsInView^i \geq 4\,?\,noSatsInView^i : 0)$$

where noSatsInView$^i$ represents the number of satellites visible for each point i selected substantially on the boundary of the approximate area. In a further embodiment of the present subject matter, assistance data may then be transmitted to an exemplary device in step 240 where the assistance data includes information from the optimum set of satellites. At step 250, the location of the wireless device may then be determined from the information.

Figure 3:
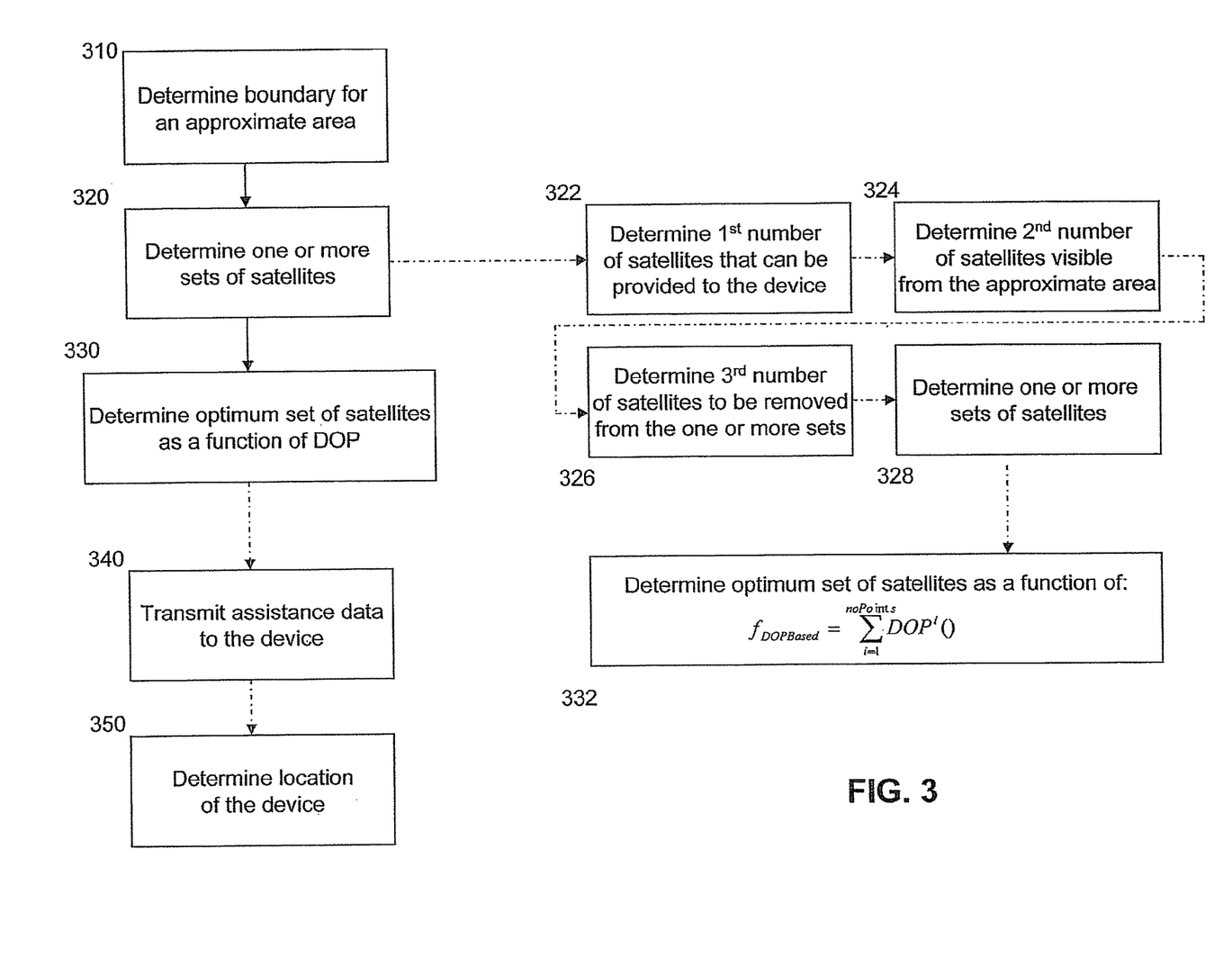
FIG. 3 is an algorithm according to another embodiment of the present subject matter.

FIG. 3 is another algorithm 300 according to an embodiment of the present subject matter. With reference to FIG. 3, at step 310, a boundary for an approximate area in which the wireless device is located may be determined. In certain embodiments of the present subject matter, the boundary may define a serving area of a base station serving the wireless device. However, the boundary may also define an approximate area of a communications network or an area or region such as, but not limited to, city, municipality, county, state, country, or continent. An exemplary device may be, but is not limited to, a cellular device, text messaging device, computer, portable computer, vehicle locating device, vehicle security device, communication device, and wireless transceiver. At step 320, one or more sets of satellites may be determined as a function of the boundary. The satellites may be a part of a GNSS such as, but not limited to, GPS, Galileo system, GLONASS system, QZSS, Beidou satellite system, Compass satellite system, and combinations thereof. At step 330, an optimum set of satellites may be determined from the one or more sets of satellites as a function of the DOP of the one or more sets of satellites at predetermined points substantially on the boundary.

In another embodiment of the present subject matter, at step 322, a first number of satellites that can be provided to the wireless device may be determined and at step 324, a second number of satellites visible from the approximate area may be determined. At step 326, a third number of satellites to be removed from the one or more sets of satellites may be determined and at step 328, the one or more sets of satellites may then be determined as a function of the first, second and third numbers. In an additional embodiment of the present subject matter, at step 332, an optimum set of satellites may be determined by minimizing the sum of the DOP at each of the one or more predetermined points. The determination may be from the one or more sets of satellites having a lowest sum of the DOP at each point i selected substantially on the boundary of the approximate area as a function of the relationship:

$$f_{DOPBased} = \sum_{i=1}^{noPoints} DOP^i().$$

In a further embodiment of the present subject matter, assistance data may then be transmitted to an exemplary device in step 340 where the assistance data includes information from the optimum set of satellites. At step 350, the location of the wireless device may then be determined from the information.

Figure 4:
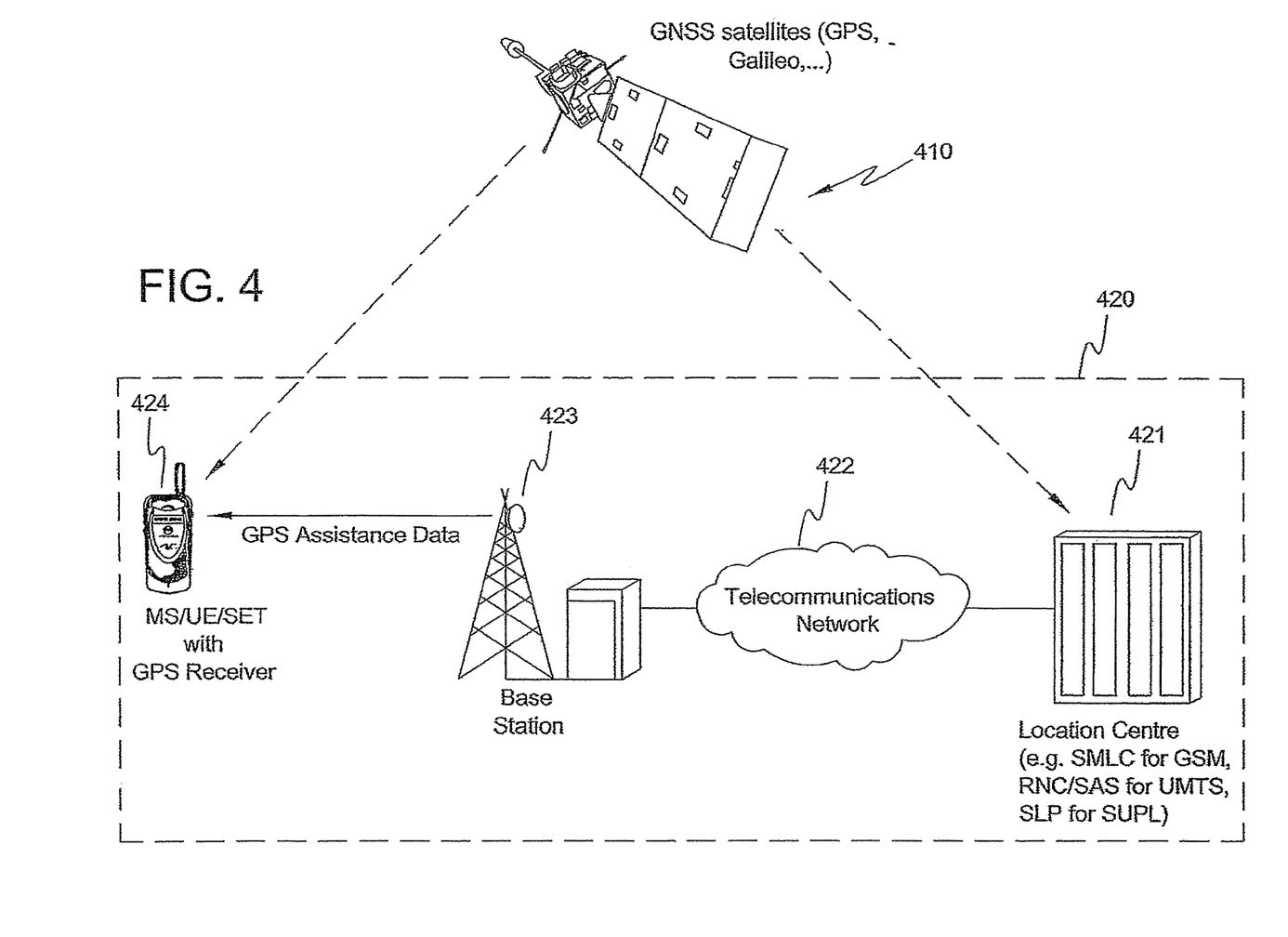
FIG. 4 is a schematic representation for implementing one embodiment of the present subject matter.

FIG. 4 is a schematic representation for implementing one embodiment of the present subject matter. With reference to FIG. 4, a satellite system 410 communicates with a ground system 420. The ground system 420 may include a cellular network having a location center 421. The location center 421 may be an MLC, LIS or a central office configured to communicate with a telecommunication network 422 and at least one base station 423. In one embodiment of the present subject matter, a device 424 communicates with the base station 423 to acquire GPS assistance data. The location center 421 may or may not receive a preliminary estimate of the receiver's location or boundary thereof on the basis of the receiver's cell site or other area, such as the boundary of the communications network or an area or region such as, but not limited to, city, municipality, county, state, country, or continent. The location center 421 may also determine a plurality of satellites as a function of this boundary or region. This information may then be transmitted or relayed to the mobile receiver and utilized for location determination. The location center 421 may also receive satellite information from GPS satellites. The satellite information may include the satellite's broadcast ephemeris information of the broadcasting satellite or that of all satellites or that of selected satellites. The location center 421 may relay the information back to the device 424 or use the information, either singularly or along with some preliminary estimation of the device's location, to assist the device in a geographic location determination. In another embodiment, any one or plural steps illustrated in FIGS. 2 and 3 may be implemented at the location center 421 and communicated to the device 424. Of course, the estimated location of the device 424 may also be determined as a function of additional signals provided by the network 422. Exemplary devices may be, but are not limited to, a cellular device, text messaging device, computer, portable computer, vehicle locating device, vehicle security device, communication device, and wireless transceiver.

As shown by the various configurations and embodiments illustrated in FIGS. 1-4, a method and system for selecting optimal satellites for A-GPS location of a device and for providing assistance data for A-GPS location of devices in a wireless network or other region are herein described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for determining a set of satellites for which assistance data may be provided to a wireless device, comprising the steps of:
   (a) determining a boundary for an approximate area in which the wireless device is located;
   (b) determining one or more sets of satellites as a function of said boundary; and
   (c) determining an optimum set of satellites by a communications network element from said one or more sets of satellites as a function of the visibility of each of said one or more sets of satellites at predetermined points substantially on said boundary.

2. The method of claim 1 wherein the step of determining one or more sets of satellites further comprises:
   (i) determining a first number of satellites that can be provided to the wireless device;
   (ii) determining a second number of satellites visible from the approximate area;
   (iii) determining a third number of satellites to be removed from said one or more sets of satellites; and
   (iv) determining said one or more sets of satellites as a function of said first, second and third numbers.

3. The method of claim 2 wherein the step of determining an optimum set of satellites further comprises determining an optimum set of satellites by maximizing the number of satellites in view from each of said one or more predetermined points.

4. The method of claim 2 wherein the step of determining an optimum set of satellites further comprises:
   (i) determining an optimum set of satellites from said one or more sets of satellites as a function of the relationship:

$$f_{satsViewBased} = \sum_{i=1}^{noPoints} (noSatsInView^i \geq 4 ? noSatsInView^i : 0)$$

where noSatsInView$^i$ represents a fourth number of satellites visible for each point (i) selected substantially on the boundary of the approximate area.

5. The method of claim 1 wherein said boundary defines an area selected from the group consisting of: a city, municipality, county, state, country, continent, a serving area of a base station serving said wireless device, and an approximate area of a communications network.

6. The method of claim 1 wherein the satellites are part of a Global Navigation Satellite System ("GNSS").

7. The method of claim 6 wherein the GNSS is selected from the group consisting of: a Global Positioning System ("GPS"), Galileo system, GLONASS system, Quasi-Zenith Satellite System ("QZSS"), Beidou satellite system, Compass satellite system, and combinations thereof.

8. The method of claim 1 wherein the device is selected from the group consisting of: cellular device, text messaging device, computer, portable computer, vehicle locating device, vehicle security device, communication device, and wireless transceiver.

9. The method of claim 1 further comprising the steps of:
   (d) transmitting assistance data to said device, said assistance data including information from said optimum set of satellites; and
   (e) determining the location of the wireless device from said information.

10. The method of claim 1 wherein the communications network element is selected from the group consisting of an Mobile Location Center, a location information server, and a location information system.

11. A method for determining the location of a wireless device, comprising the steps of:
   (a) determining a boundary for an approximate area in which the wireless device is located;
   (b) determining one or more sets of satellites as a function of said boundary;
   (c) determining an optimum set of satellites from said one or more sets of satellites as a function of the visibility of each of said one or more sets of satellites at predetermined points substantially on said boundary;
   (d) transmitting assistance data to said device, said assistance data including information from said optimum set of satellites; and
   (e) determining the location of the wireless device from said information.

12. The method of claim 11 wherein determining one or more sets of satellites further comprises:
   (i) determining a first number of satellites that can be provided to the wireless device;
   (ii) determining a second number of satellites visible from the approximate area;
   (iii) determining a third number of satellites to be removed from said one or more sets of satellites; and
   (iv) determining said one or more sets of satellites as a function of said first, second and third numbers.

13. The method of claim 12 wherein the step of determining an optimum set of satellites further comprises determining an optimum set of satellites by maximizing the number of satellites in view from each of said one or more predetermined points.

14. The method of claim 12 wherein the step of determining an optimum set of satellites further comprises:
   (i) determining an optimum set of satellites from said one or more sets of satellites as a function of the relationship:

$$f_{satsViewBased} = \sum_{i=1}^{noPoints} (noSatsInView^i \geq 4 ? noSatsInView^i : 0)$$

where $noSatsInView^i$ represents a fourth number of satellites visible for each point (i) selected substantially on the boundary of the approximate area.

* * * * *